(12) United States Patent
Coyle et al.

(10) Patent No.: US 7,859,759 B2
(45) Date of Patent: Dec. 28, 2010

(54) FILM, BACKLIGHT DISPLAYS, AND METHODS FOR MAKING THE SAME

(75) Inventors: Dennis Joseph Coyle, Clifton Park, NY (US); Eugene George Olczak, Pittsford, NY (US); Masako Yamada, Saratoga Springs, NY (US); Scott Michael Miller, Clifton Park, NY (US); Nitin Garg, Guilderland, NY (US)

(73) Assignee: Sabic Innovative Plastics IP B.V. (NL)

( * ) Notice: Subject to any disclaimer, the term of this patent is extended or adjusted under 35 U.S.C. 154(b) by 8 days.

(21) Appl. No.: 12/141,674

(22) Filed: Jun. 18, 2008

(65) Prior Publication Data

US 2009/0052045 A1 Feb. 26, 2009

Related U.S. Application Data

(63) Continuation-in-part of application No. 12/037,399, filed on Feb. 26, 2008, now abandoned, and a continuation-in-part of application No. 11/979,027, filed on Oct. 30, 2007, which is a continuation of application No. 11/460,309, filed on Jul. 27, 2006, now Pat. No. 7,324,284, which is a continuation of application No. 11/019,640, filed on Dec. 23, 2004, now Pat. No. 7,180,672, which is a continuation-in-part of application No. 10/150,958, filed on May 20, 2002, now Pat. No. 6,862,141.

(51) Int. Cl.
*G02B 27/10* (2006.01)
(52) U.S. Cl. ..................................... 359/625
(58) Field of Classification Search ................. 359/619, 359/620, 625, 626, 454, 455, 459
See application file for complete search history.

(56) References Cited

U.S. PATENT DOCUMENTS 2,403,731 A 7/1946 MacNeille (Continued)

FOREIGN PATENT DOCUMENTS

JP 55089806 A 7/1980

(Continued)

OTHER PUBLICATIONS

Japanese Patent No. 2072388 (A); Publication Date: Mar. 12, 1990; Abstract Only; 1 Page.

(Continued)

*Primary Examiner*—Alicia M Harrington
(74) *Attorney, Agent, or Firm*—Cantor Colburn LLP

(57) ABSTRACT

In one embodiment a film can comprises a surface comprising a plurality of prism structures. Each prism structure has a lateral modulation in the w direction of less than or equal to ±20% of an average pitch of the prism structures. The plurality of prism structures can have a variation in the w direction of prism peak height that is discrete and/or continuous. In one embodiment, a method for making a film can comprise forming a plurality of prism structures on a surface. The plurality of prism structures can have a lateral modulation in the w direction of less than or equal to ±20% of an average pitch of the prism structures, and wherein the plurality of prism structures have a variation in the w direction of prism peak height that is discrete and/or continuous.

15 Claims, 11 Drawing Sheets

U.S. PATENT DOCUMENTS

| | | |
|---|---|---|
| 4,542,449 A | 9/1985 | Whitehead |
| 4,576,850 A | 3/1986 | Martens |
| 4,906,070 A | 3/1990 | Cobb, Jr. |
| 4,984,144 A | 1/1991 | Cobb, Jr. et al. |
| 5,005,108 A | 4/1991 | Pristash et al. |
| 5,056,892 A | 10/1991 | Cobb, Jr. |
| 5,303,322 A | 4/1994 | Winston et al. |
| 5,390,276 A | 2/1995 | Tai et al. |
| 5,439,621 A | 8/1995 | Hoopman |
| 5,552,907 A | 9/1996 | Yokota et al. |
| 5,557,836 A | 9/1996 | Smith et al. |
| 5,564,870 A | 10/1996 | Benson et al. |
| 5,764,315 A | 6/1998 | Yokota et al. |
| 5,769,522 A | 6/1998 | Kaneko et al. |
| 5,771,328 A | 6/1998 | Wortman et al. |
| 5,808,784 A | 9/1998 | Ando et al. |
| 5,851,062 A | 12/1998 | Shinohara et al. |
| 5,861,990 A | 1/1999 | Tedesco |
| 5,876,107 A | 3/1999 | Parker et al. |
| 5,887,964 A | 3/1999 | Higuchi et al. |
| 5,917,664 A | 6/1999 | O'Neill et al. |
| 5,919,551 A | 7/1999 | Cobb, Jr. et al. |
| 5,944,405 A | 8/1999 | Takeuchi et al. |
| 5,982,540 A | 11/1999 | Koike et al. |
| 6,002,829 A | 12/1999 | Winston et al. |
| 6,052,164 A | 4/2000 | Cobb, Jr. et al. |
| 6,091,547 A | 7/2000 | Gardiner et al. |
| 6,108,131 A | 8/2000 | Hansen et al. |
| 6,208,463 B1 | 3/2001 | Hansen et al. |
| 6,213,606 B1 | 4/2001 | Holman et al. |
| 6,243,068 B1 | 6/2001 | Evanicky et al. |
| 6,275,310 B1 | 8/2001 | Cohn |
| 6,277,471 B1 | 8/2001 | Tang |
| 6,280,063 B1 | 8/2001 | Fong et al. |
| 6,290,364 B1 | 9/2001 | Koike et al. |
| 6,322,236 B1 | 11/2001 | Campbell et al. |
| 6,335,999 B1 | 1/2002 | Winston et al. |
| 6,354,709 B1 | 3/2002 | Campbell et al. |
| 6,356,391 B1 | 3/2002 | Gardiner et al. |
| 6,456,437 B1 | 9/2002 | Lea et al. |
| 6,535,788 B1 | 3/2003 | Yoshida et al. |
| 6,576,887 B2 | 6/2003 | Whitney et al. |
| 6,701,211 B2 | 3/2004 | Orczykowski et al. |
| 6,707,611 B2 | 3/2004 | Gardiner et al. |
| 6,759,113 B1 | 7/2004 | Tang |
| 6,811,274 B2 | 11/2004 | Olczak |
| 6,846,098 B2 | 1/2005 | Bourdelais et al. |
| 6,862,141 B2 | 3/2005 | Olczak |
| 6,900,941 B2 | 5/2005 | Kaminsky et al. |
| 6,952,627 B2 | 10/2005 | Olczak et al. |
| 6,975,455 B1 | 12/2005 | Kotchick et al. |
| 7,125,131 B2 | 10/2006 | Olczak |
| 7,142,767 B2 | 11/2006 | Gardiner |
| 7,179,513 B2 | 2/2007 | Jones et al. |
| 7,180,672 B2 | 2/2007 | Olczak |
| 7,221,847 B2 | 5/2007 | Gardiner et al. |
| 7,251,079 B2 | 7/2007 | Capaldo et al. |
| 7,384,173 B2 | 6/2008 | Whitney |
| 2001/0051264 A1 | 12/2001 | Mazurek et al. |
| 2002/0061178 A1 | 5/2002 | Winston et al. |
| 2002/0080598 A1 | 6/2002 | Parker et al. |
| 2002/0097496 A1 | 7/2002 | Lu |
| 2002/0101659 A1 | 8/2002 | Hansen et al. |
| 2003/0035231 A1 | 2/2003 | Epstein et al. |
| 2004/0051987 A1 | 3/2004 | Bauer et al. |
| 2006/0056031 A1 | 3/2006 | Capaldo et al. |
| 2006/0226583 A1 | 10/2006 | Marushin et al. |
| 2007/0031140 A1 | 2/2007 | Biernath et al. |
| 2008/0106793 A1 | 5/2008 | Olczak |

FOREIGN PATENT DOCUMENTS

| | | |
|---|---|---|
| JP | 55120001 A | 9/1980 |
| JP | 55120002 A | 9/1980 |
| JP | 2072388 A | 3/1990 |
| JP | 2221926 A | 9/1990 |
| JP | 4303802 A | 10/1992 |
| JP | 5060908 A | 3/1993 |
| JP | 5142422 A | 6/1993 |
| JP | 5173134 A | 7/1993 |
| JP | 5313004 A | 11/1993 |
| JP | 6018707 A | 1/1994 |
| JP | 6027325 A | 2/1994 |
| JP | 6043310 A | 2/1994 |
| JP | 6082634 A | 3/1994 |
| JP | 6138308 A | 5/1994 |
| JP | 6148408 A | 5/1994 |
| JP | 6186562 A | 7/1994 |
| JP | 7104109 A | 4/1995 |
| JP | 7230001 A | 8/1995 |
| JP | 8146418 A | 6/1996 |
| JP | 8160203 A | 6/1996 |
| JP | 8220344 A | 8/1996 |
| JP | 8286629 A | 11/1996 |
| JP | 8313710 A | 11/1996 |
| JP | 9145932 A | 6/1997 |
| JP | 9304607 A | 11/1997 |
| JP | 2001166113 A | 6/2001 |
| JP | 2001183642 A | 7/2001 |
| JP | 2006082645 A | 3/2006 |
| WO | WO 98/33006 A2 | 7/1998 |
| WO | WO 99/63394 A1 | 12/1999 |
| WO | 2008126975 A1 | 10/2008 |

OTHER PUBLICATIONS

Japanese Patent No. 2221926 (A); Publication Date: Sep. 4, 1990; Abstract Only; 1 Page.

Japanese Patent No. 2277002 (A); Publication Date: Nov. 13, 1990; Abstract Only; 1 Page.

Japanese Patent No. 4303802 (A); Publication Date: Oct. 27, 1992; Abstract Only; 1 Page.

Japanese Patent No. 5060908 (A); Publication Date: Mar. 12, 1993; Abstract Only; 1 Page.

Japanese Patent No. 5142422 (A); Publication Date: Jun. 11, 1993; Abstract Only; 1 Page.

Japanese Patent No. 5173134 (A); Publication Date: Jul. 13, 1993; Abstract Only; 1 Page.

Japanese Patent No. 5313004 (A); Publication Date: Nov. 26, 1993; Abstract Only; 1 Page.

Japanese Patent No. 55089806 (A); Publication Date: Jul. 7, 1980; Abstract Only; 1 Page.

Japanese Patent No. 55120001 (A); Publication Date: Sep. 16, 1980; Abstract Only; 1 Page.

Japanese Patent No. 55120002 (A); Publication Date: Sep. 16, 1980; Abstract Only; 1 Page.

Japanese Patent No. 6018707 (A); Publication Date: Jan. 28, 1994; Abstract Only; 1 Page.

Japanese Patent No. 6027325 (A); Publication Date: Feb. 4, 1994; Abstract Only; 1 Page.

Japanese Patent No. 6043310 (A); Publication Date: Feb. 18, 1994; Abstract Only; 1 Page.

Japanese Patent No. 6082634 (A); Publication Date: Mar. 25, 1994; Abstract Only; 1 Page.

Japanese Patent No. 6138308 (A); Publication Date: May 20, 1994; Abstract Only; 1 Page.

Japanese Patent No. 6148408 (A); Publication Date: May 27, 1994; Abstract Only; 1 Page.

Japanese Patent No. 6186562 (A); Publication Date: Jul. 8, 1994; Abstract Only; 1 Page.

Japanese Patent No. 7104109 (A); Publication Date: Apr. 21, 1995; Abstract Only; 1 Page.

Japanese Patent No. 7230001 (A); Publication Date: Aug. 29, 1995; Abstract Only; 1 Page.
Japanese Patent No. 8146418 (A); Publication Date: Jun. 7, 1996; Abstract Only; 1 Page.
Japanese Patent No. 8160203 (A); Publication Date: Jun. 21, 1996; Abstract Only; 1 Page.
Japanese Patent No. 8220344 (A); Publication Date: Aug. 30, 1996; Abstract Only; 1 Page.
Japanese Patent No. 8286629 (A); Publication Date: Nov. 1, 1996; Abstract Only; 1 Page.
Japanese Patent No. 8313710 (A); Publication Date: Nov. 29, 1996; Abstract Only; 1 Page.
Japanese Patent No. 9145932 (A); Publication Date: Jun. 6, 1997; Abstract Only; 1 Page.
Japanese Patent No. 9304607 (A); Publication Date: Nov. 28, 1997; Abstract Only; 1 Page.
Japanese Patent No. 2001166113 (A); Publication Date: Jun. 22, 2001; Abstract Only; 1 Page.
Japanese Patent No. 2001183642 (A); Publication Date: Jul. 6, 2001; Abstract Only; 1 Page.
Japanese Patent No. 2006082645 (A); Publication Date: Mar. 30, 2006; Abstract Only; 1 Page.
3M Innovation; 3M Brightness Enhancement Film (III) Advertisement; 1998; 6 pages.
David J. Whitehouse; Handbook of Surface Metrology; IOP Publishing Ltd.: 1994; pp. 49-58.
Machine Design; "Plastic Film Reflects Around the Corner"; Aug. 1997; p. 52.
Max Levy Autograph, Inc. MLA 4000 Series Ultra Precision Micro Machining/Contouring System; Bulletin 2050; Advertisement; 1998; 6 pages.
Chinese Application No. 2003801063633; Text of the First Office Action; Received: Jun. 12, 2007; 3 Pages.
International Search Report; International Application No. PCT/US03/39178; International Filing Date: Dec. 9, 2003; Date of Mailing: May 26, 2004; 9 Pages.
A. Tagaya, Y. Koike; "Highly Scattering Optical Transmission Polymers for Bright Display"; Macromol. Symp., vol. 154; Published: 2000; pp. 73-82.
Backlight Optics; Accessed: Feb. 14, 2003; pp. F-2/37-F-2/44.
S.G. Saxe; Solar Energy Materials; Prismatic Film Light Guides: Performance and Recent Developments; vol. 10, No. 95-109; Published: 1989; North-Holland, Amsterdam; pp. 95-109.
International Search Report; International Application No. PCT/US2009/035095; International Filing Date: Feb. 25, 2009, Date of Mailing: Apr. 29, 2009, 7 Pages.
Written Opinion of the International Searching Authority; International Application No. PCT/US2009/035095; International Filing Date: Feb. 25, 2009; Date of Mailing: Apr. 29, 2009, 8 Pages.

FILM, BACKLIGHT DISPLAYS, AND METHODS FOR MAKING THE SAME

CROSS-REFERENCE TO RELATED APPLICATIONS

This application is a continuation-in-part application of U.S. application Ser. No. 12/037,399 filed on Feb. 26, 2008 now abandoned, and a continuation-in-part application of U.S. application Ser. No. 11/979,027 filed on Oct. 30, 2007, which is a continuation of U.S. application Ser. No. 11/460,309, filed Jul. 27, 2006, now U.S. Pat. No. 7,324,284, which is a continuation of U.S. application Ser. No. 11/019,640, filed Dec. 23, 2004, now U.S. Pat. No. 7,180,672 which is a continuation-in-part application of U.S. application Ser. No. 10/150,958 filed on May 20, 2002, now U.S. Pat. No. 6,862,141, which are all incorporated by reference herein.

BACKGROUND

Brightness enhancing films can be used in a variety of applications, for example, interior illumination, light guides, and liquid crystalline displays (LCDs) such as those found in computer monitors. When employed in LCDs, one or more brightness enhancing films are used to increase the amount of light directed towards the viewer. This allows lower intensity, and thus less costly, bulbs to be used in the LCD. A backlight illuminates the liquid crystal display panel to desirably provide a uniformly intense light distribution over the entire plane of the LCD display panel. A backlight system typically incorporates a light pipe to couple light energy from a light source to the LCD panel. An array of diffusing elements can be disposed along one surface of the light pipe to scatter incident light rays toward an output plane. The output plane directs the light rays into and through the LCD panel. The backlight can use a light modulating optical substrate with prismatic or textured structures to direct light along a viewing axis, usually normal to the display and to spread illumination over a viewer space. The brightness enhancement optical substrate and diffuser film combinations enhance the brightness of the light viewed by a user and reduce the display power required to produce a target illumination level. This increase in brightness is customarily reported as the "gain," which is the ratio of luminance using the brightness-enhancement film to the luminance without using the brightness-enhancing film, both measured on-axis, that is, in a direction perpendicular to the plane of the film towards the viewer.

It is also known to place two sheets of light directing film adjacent one another with their prisms oriented approximately perpendicular to one another to further increase the amount of light directed approximately normal to the axis of the display. While this construction effectively increases the amount of on axis light exiting the display, the resulting structure can exhibit uneven light transmission across the surface area of the display under certain conditions. This uneven light transmission is typically manifested by visibly apparent bright spots, streaks, or lines on the surface of the display; a condition caused by optical coupling between contacting, or very nearly contacting, surfaces of the adjacent sheets of light directing film, also known as "wet-out". Wet-out occurs as a result of optical coupling between the prisms of one sheet and the smooth surface of the other. The optical coupling prevents total internal reflection from occurring along these peaks. The result is a mottled and varying appearance to the backlight. Such visibly apparent variations in the intensity of transmitted light across the surface area of the display are undesirable.

Additionally, for brightness enhancing films in a display that is intended for close viewing, such as a computer display, the cosmetic requirements are very high. This is because, when such displays are studied very closely or used for an extended period of time, even very small defects can be visible and annoying. Elimination of such defects can be very costly both in inspection time and discarded materials.

A second type of film used in LCDs is a diffusion film. As the name suggests, the diffusion film diffuses light directed to the viewer in order to reduce interference patterns such as Moire patterns. Such diffusers will hide many of the defects, making them invisible to the user. This will significantly improve manufacturing yield, while only adding a small increase in cost to the manufactured part. The disadvantage of this approach is that the diffuser will scatter the light and thus decrease on-axis gain. Therefore, a diffuser will increase yield but at the expense of some performance.

Hence, there is a continuing need for optical film systems that retain gain while reducing visible defects and wet-out.

BRIEF SUMMARY

Disclosed herein are films, backlight displays, and methods of making and using the same.

In one embodiment, the film can comprise a surface comprising a plurality of prism structures. Each prism structure has a lateral modulation in the w direction of less than or equal ±20% of an average pitch of the prism structures. The plurality of prism structures can have a variation in the w direction of prism peak height that is discrete and/or continuous.

The film(s) can be employed in a backlight display comprising a light source.

In one embodiment, a method for making a film, comprises: forming a plurality of prism structures on a surface, wherein the plurality of prism structures have a lateral modulation in the w direction of less than or equal ±20% of an average pitch of the prism structures, and wherein the plurality of prism structures have a variation in the w direction of prism peak height that is discrete and/or continuous.

The above described and other features are exemplified by the following Figures and detailed description.

BRIEF DESCRIPTION OF THE DRAWINGS

Refer now to the Figures, which are exemplary embodiments, and wherein the like elements are numbered alike.

DETAILED DESCRIPTION

Figure 4:
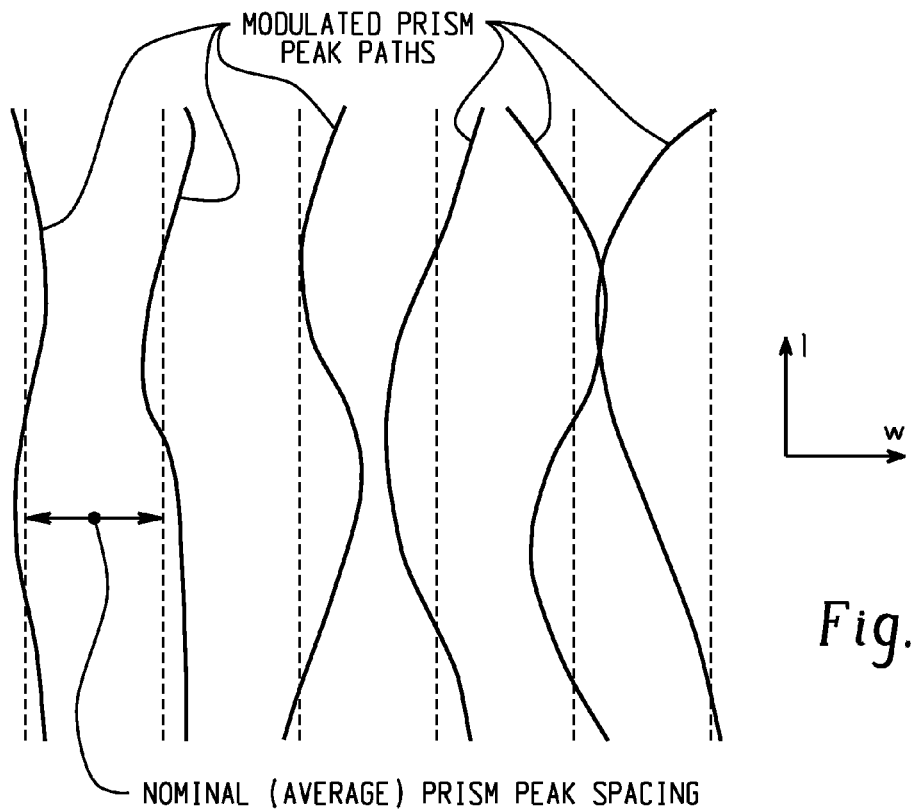
FIG. 4 is an overhead view of a section of modulated prism paths that are modulated in the w direction along the l direction.

As is explained above, even very small defects in an optical film (e.g., in a brightness enhancement film) can be visible and annoying. Even periodicity in the film can be identified by the unaided eye, and hence has been considered a problem itself. There is a need for films that retain gain while avoiding wet-out and visible defects. Wet-out has been reduced, and even eliminated, by employing a periodic, sinusoidal structure wherein the prism peak is varied and highest prism peak height appears periodically (and sometimes in clusters or zones) at an interval, measured in the w direction, of greater than or equal to five times the distance between prism peaks (i.e., five times the average pitch wherein the average is determined over a sample length in the w direction of 0.5 millimeters (mm) to 100 mm). The interval length in the l direction over which the highest prism height is varied is equivalently greater than or equal to 5 times the circumference of the master tool from which the films were made, where a typical circumference would be 0.5 meters to 1.0 meters. Although this periodic high point solved the wet-out problem, it introduced a visible periodicity into the film which manifested itself as a visible streakiness. It has unexpectedly been discovered that, with the combination of the sinusoidal periodicity of peak height in h direction and a slight lateral modulation of peak height in the w direction (both occurring along a prism length that is nominally in the l direction (see FIG. 4)), wet-out issues have been addressed while avoiding streaking, substantially retaining and minimizing production loss and waste. Unexpectedly, a mere 5% (of the average pitch) lateral modulation (e.g., ±2 micrometer (μm) lateral modulation for an average 37 μm pitch) in combination with a substantially sinusoidal height modulation which is periodic wherein the peak height modulation frequency is sufficient to avoid optical coupling between adjacent collimating films, wet-out can be substantially reduced or eliminated while avoiding streakiness.

In one embodiment the film comprises a surface comprising a plurality of prism structures. Each prism structure can have a lateral modulation in the w direction of less than or equal to ±20% of the average pitch of the prisms. Additionally, the plurality of prism structures can have a variation in prism peak height that is discrete, continuous, or a combination of both discrete and continuous. The prism structures can have a height variation comprising sinusoidal function(s).

In one embodiment the film comprises a surface comprising a plurality of prism structures. Each prism structure has a lateral modulation in the w direction of ±2 μm to ±20 μm along the length of each prism in the l direction. The plurality of prism structures has a sinusoidal height modulation in an h direction along the length of each prism in the l direction, with a highest prism peak height that is periodic at an interval measured in the w direction of greater than or equal to five times an average pitch. The average pitch is determined over a sample length in the w direction of 100 mm. Equivalently, the highest prism peak height is periodic at an interval greater than or equal to typically 2.5 meters as measured along the l direction. The w direction is perpendicular to the l direction. Optionally, the modulation is less than or equal to ±10 micrometers, or less than or equal to ±5 micrometers. The prism structures have a height modulation along a length l. The majority of prism peaks can be greater than or equal to 0.5 micrometers below the highest prism peak height for any profile taken in the w direction. Clusters of high peaks can contain less than or equal to 3 peaks and each cluster is separated by greater than or equal to 5 peaks, wherein a cluster is a group of adjacent peaks with a height within 0.25 micrometers of the highest prism peak height. The lateral modulation can comprise a variable prism spacing. Optionally, the height modulation can be random or pseudo random. Similarly, the lateral modulation can optionally be random or pseudo random.

In another embodiment the film can comprises a surface comprising a plurality of prism structures. Each prism structure has a lateral modulation in the w direction of ±2% to ±20% of an average pitch of the prisms. The plurality of prism structures can have a variation in the w direction of prism peak height that is discrete and/or continuous. In these films, a highest prism peak height can be periodic at an interval measured in the w direction of greater than or equal to five times an average pitch, wherein the average pitch is determined over a sample length in the w direction of 100 mm, wherein the interval w direction is perpendicular to the l direction. Also, a majority of prism peaks can be greater than or equal to 0.5 micrometers below the highest prism peak height for any profile taken in the w direction. The film can comprise clusters of peaks, as determined in the w direction, wherein each cluster contains less than or equal to 3 peaks and each cluster is separated by greater than or equal to 5 peaks, and wherein a cluster is a group of adjacent peaks with a height within 0.25 micrometers of a highest prism peak height. The modulation can be ±5% to ±10% of the average pitch. The prism structures can have a height modulation in the l direction. This height modulation can random. The lateral modulation can comprise a variable prism spacing. This lateral modulation can be random. The variation can be periodic and sinusoidal.

Figure 6:
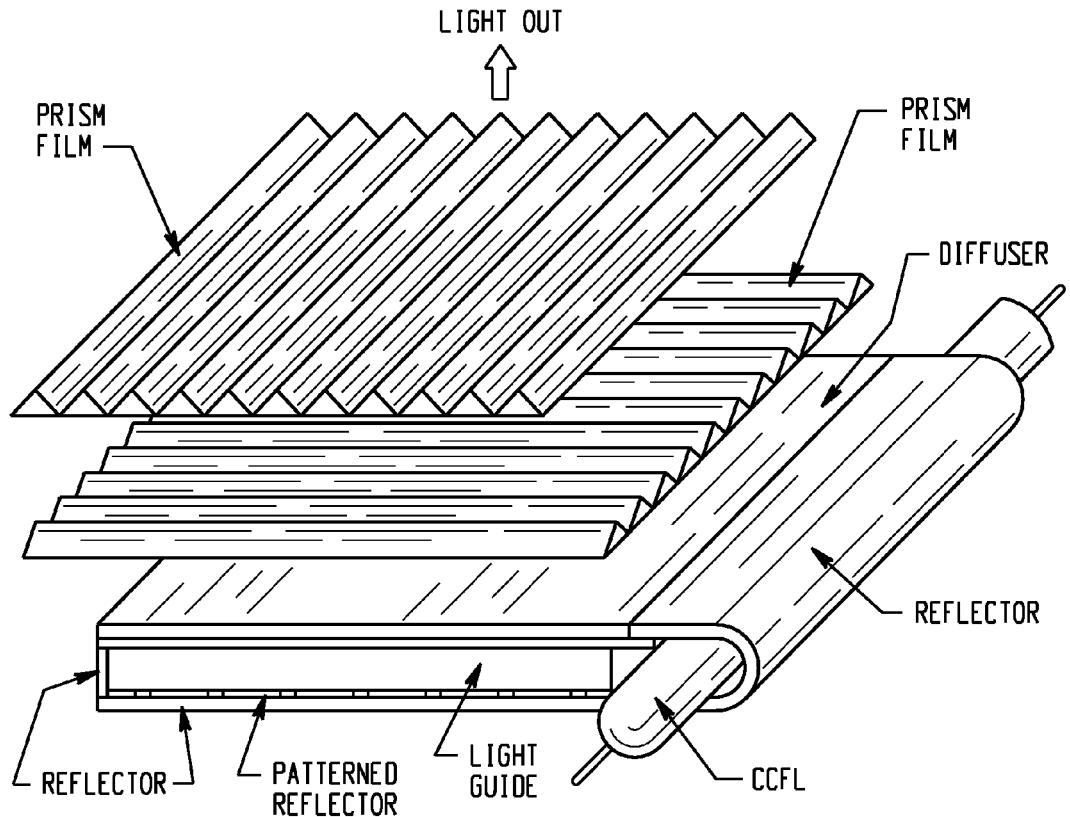
FIG. 6 depicts a display backlight.

In some embodiments the backlight display can comprise: light source(s) and film(s). The display can comprise diffuser(s), reflector(s) (e.g., pattered reflector(s)), and/or light guide(s). The reflector(s) can be disposed on a side of the light guide opposite the film(s). The diffuser(s) can be disposed on one or both sides of the film(s), wherein the films can be disposed such that the prisms structures of one film are oriented at a direction perpendicular to the prism structures of an adjacent film (e.g., as is illustrated in FIG. 6).

In one embodiment, a method for making a film can comprise: forming a plurality of prism structures having a lateral modulation in a w direction along a prism in the l direction on a surface of an optical substrate, wherein the lateral modulation can be ±2 μm to ±20 μm. The plurality of prism structures can have a sinusoidal height profile in an h direction, wherein a highest prism peak height is periodic at an interval in the w direction of greater than or equal to five times an average pitch. The average pitch is determined over a sample length in the w direction of 100 mm. The w direction, which is perpendicular to the l direction, is defined as illustrated in FIG. 1.

In another embodiment, a method for making a film, comprises: forming a plurality of prism structures on a surface, wherein the plurality of prism structures have a lateral modulation in the w direction of ±2% to ±20% of an average pitch of the prisms, and wherein the plurality of prism structures have a variation in the w direction of prism peak height that is discrete and/or continuous.

One method for making an optical film can comprise forming a plurality of prism structures having a lateral modulation in a l direction on a surface of an optical substrate, wherein has the lateral modulation has of less than or equal to ±50% of an average pitch, or, specifically, less than or equal to ±25% of the average pitch, or, yet more specifically, ±2% to ±15% of the average pitch. For example, the lateral modulation can be less than or equal to ±20 μm, and a height modulation can be 0.25 μm to 1.0 μm.

Figure 1:
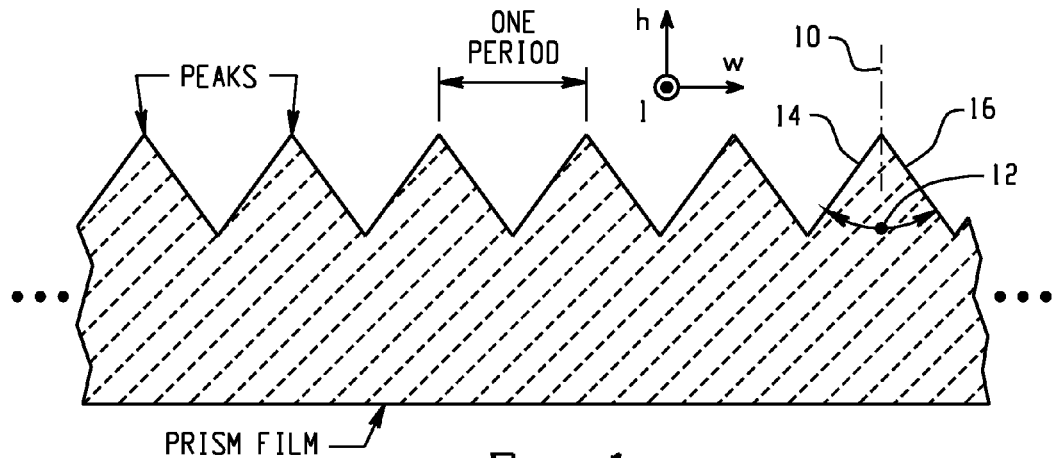
FIG. 1 is a cross-sectional illustration of an exemplary prism film.

As shown in FIG. 1 the cross section a prior prism film reveals an upper surface that is corrugated (i.e., the surface is comprised of a linear array of prism structures), each prism having straight facets, which in this illustration, are symmetrically disposed around a peak (maximum in h) for each prism in a direction w that is a lateral direction for the prism film. The prisms are described as a linear array since the distance between adjacent peaks has a fixed pitch in the w direction and the pitch is held constant along the length of each prism. The pitch is the spacing in w between adjacent peaks. The length dimension is defined along a direction "l" that is normal to the page in FIG. 1. In FIG. 1 the prisms each have straight sides with a peak angle 12 that is symmetric about a line 10 though the peak in the h direction. The peak angle 12 includes the total included angle between the left and right facets (14, 16, respectively). If each facet where curved the peak angle would be the angle between the lines tangent to each facet where the facets meet at the peak.

In a brightness enhancement film the peak angle can generally be 85 to 120 degrees. The most popular design has a left facet slope of +45 degrees (change in h over change in w) and a right facet slope of −45 degrees. In a turning film the peak angle the peak angle can be 50 to 80 degrees. In a front lighting film the peak can be asymmetric and the peak angle can be 0 to 30 degrees. In some cases the peaks are rounded or blunted (flat peaks) across a width of less than or equal to 2 micrometers (μm), e.g., to improve abrasion resistant.

Brightness enhancement films typically have a thickness (in an h direction orthogonal to w and l) of 12 micrometers to 250 micrometers. In is understood that the film can be a thicker substrate (up to several millimeters in thickness), more typically identified as a plate. In the following discussion the term film will be used throughout to identify the optical device regardless of thickness, and since brightness enhancement is not the sole application, prism film and even optical film may be used generally refer to the substrate.

Figure 2:
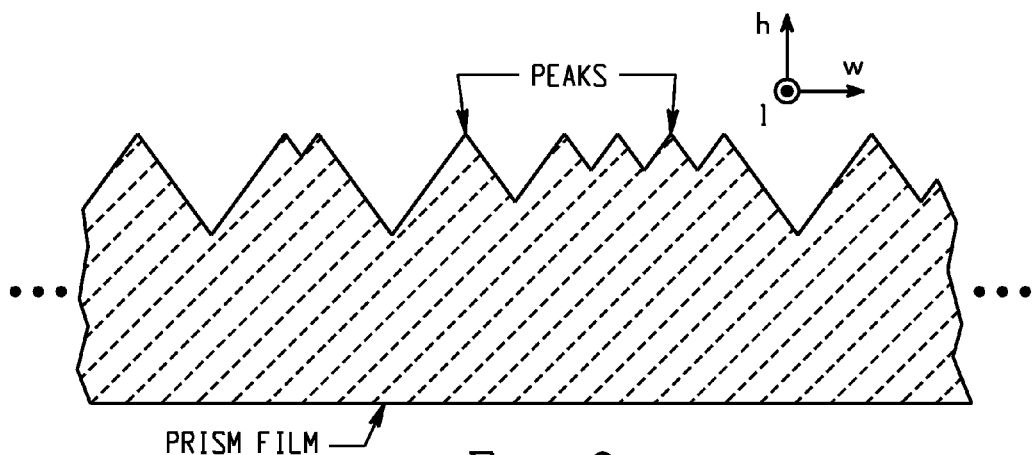
FIG. 2 is a cross-sectional illustration of an exemplary prism film with variable prism spacing.

FIG. 2 shows an example of a substrate (e.g., a prism film) with variable prism spacing. Note that in contrast to the structure in FIG. 1, the distance between adjacent prism peaks is not constant. By averaging the distance between adjacent peaks over a number of peaks one can define an average pitch. The average can vary across a substrate, i.e., if, for example, ten or less adjacent peaks are used to define an average and the substrate surface comprises one hundred or more prisms (also called prism structures), the average pitch can be designed to vary. It is noted that this average is the average for the profile sample being examined, wherein the length sample in the w direction is between 0.5 mm and 100 mm.

Figure 3:
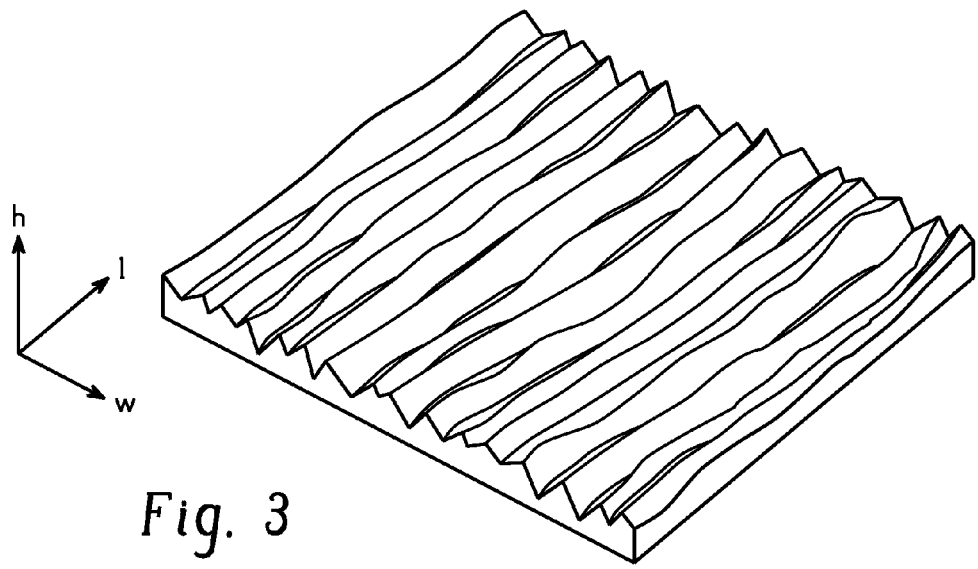
FIG. 3 is a perspective view of an embodiment of a film having a modulated prism path.

Optionally, the peak's position for each prism can (individually) vary in the lateral w direction along the l length direction for each prism peak as shown in FIG. 3. This variation is defined as lateral modulation. The modulation comprises modulating the structures (e.g., prismatic structures, and so forth) of an optical film from the nominal linear path (non varying) in a lateral direction w (direction perpendicular to the height), along the length l, by using a waveform or waveforms that are a function of l that have a nonrandom, random (or pseudo random) amplitude and/or period, wherein, here, amplitude refers to the maximum excursion perpendicular to a straight line fit to the modulated prism path. For each prism this straight line will be substantially parallel to l. The amplitude can be less than the average pitch or larger than the average pitch. As noted above, an amplitude of 4 micrometers (e.g., plus or minus 2 micrometers from center), is sufficient to eliminate streakiness. The modulation can be less than or equal to ±20 micrometers, or, specifically, less than or equal to ±10 micrometers, or, more specifically, less than or equal to ±5 micrometers, or, specifically, ±2 micrometers to ±110 micrometers, e.g., for an average pitch of 37 micrometers. The maximum modulation can be 2% to 100%, or, specifically, 5% to 90%, or, more specifically, 2% to 50%, or, more specifically, 10% to 25%, of the average pitch with larger modulations having the disadvantage of reduced brightness. In some embodiments, the modulation is 70% to 95%, or, specifically, 75% to 90% of the average pitch. For example, a film can have a height modulation of 0.5 micrometers (μm) to 1 μm, and/or a lateral modulation of ±5% to ±100% of the pitch.

Examples of lateral modulation waveforms include sinusoidal waveforms where the sinusoid has a random phase, frequency, or amplitude, or a combination comprising at least one of the foregoing. Another example is a waveform where the signal is produced by filtering a random noise waveform (uniform, Gaussian, or pink noise, are examples) with a band pass, low pass, or high pass filter. The signal can be continuous (analog), discrete (sampled), or a combination of both. The lateral modulations waveform or neighboring prisms can include interactions between the prisms. For example, a two dimensional filter can be applied such that the random wave forms are filtered along the length l and also include numerical input from the noise waveforms of adjacent prisms. One such implementation would be to low pass filter the noise waveforms in the l direction and high pass filter between noise waveforms in the w direction. By filtering in two dimensions the visible grain of the surface can be controlled in a very general way to avoid undesirable spatial frequencies. The filters can be discrete or continuous or a combination of both. In the example above the w direction filter would most likely be discrete, with the l direction filter as least approximately continuous. The wavelength cut offs for the various filters that can be applied are 10 micrometers to 10 millimeters. This range can also be applied to sinusoidal components that are used for lateral modulation.

Figure 5:
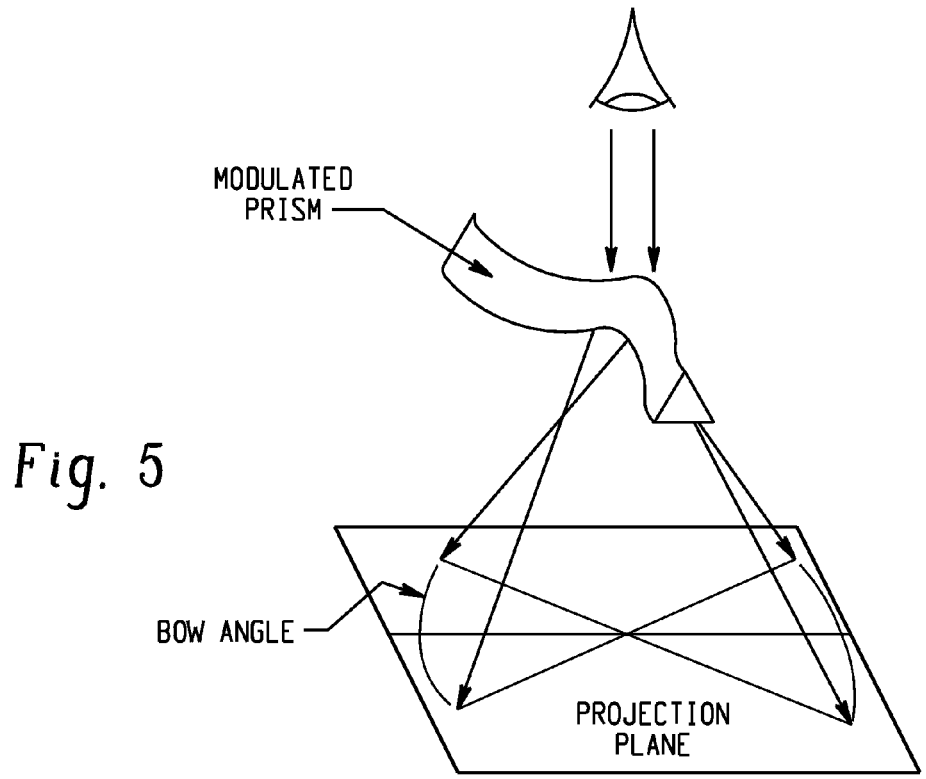
FIG. 5 is a perspective view of the turning and diffusing of light beams, illustrating bow diffusion.

The macroscopic blur function of a typical prism film with straight facets results in a double image with the image doubling effect increasing as function of the distance between the prism array surface and the object. Due to the various modulation paths in the randomized structure introduced here, there is an additional component to the blur function that is due to curvature of the paths. The effect is that of a rotation of each of the split images around an arc. This is called "bow diffusion" due to the resemblance that the blur function has to a bow tie. (See FIG. 5) Generally, increased slope in the path results in increased blur.

Although modulation of greater than 5% or the average pitch could be employed to address moiré effects, it was not known or believed that lateral modulation could be employed in combination with height modulation (modulation in peak height as a function of l or between different prisms) due to a periodic sinusoidal waveform, to reduce or eliminate periodicity induced streakiness while preventing optical coupling.

Figure 7:
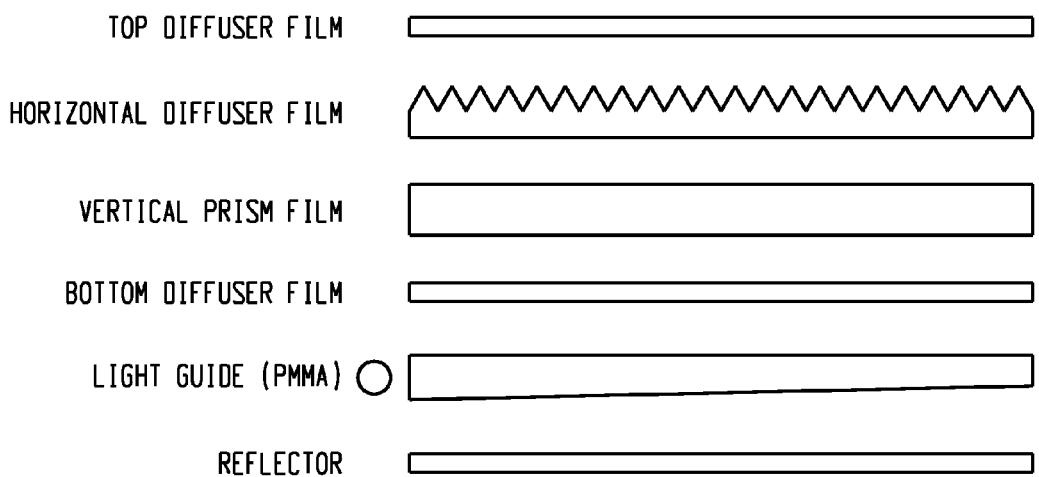
FIG. 7 depicts a display backlight.

FIGS. 6 and 7 depict exemplary backlight displays. Light enters the display from the light source (e.g., cold cathode fluorescent light (CCFL); one or more light emitting diodes might also be used) and passes through the light guide where it is reflected toward the diffuser. The light passes through the diffuser and into the prism films where it is collimated and directed out of the display (see light out arrow). Light that is directed back toward the diffuser is reflected by the reflector back toward the prism film. The bulk statistical properties of such a film are characterized by parameters such as optical gain and viewing angle. The prism films shown in the figures may be designed with the present disclosure, i.e. the display backlight can comprise one or more prism films.

One method for characterizing surfaces is the autocorrelation function. Let the height of the surface along a cross section be given by $f(x)$ where x is the position along the cross-section. The auto correlation function of $f(x')$ is given by $$c_f(x') = \int_{-\infty}^{\infty} f(x-x')f(x)\,dx \quad \text{Equation 1}$$

where x' is a shift in coordinate x. The autocorrelation function $c_f(x')$ is symmetrical about x' equal to zero and has a Fourier transform relationship with the power spectral density of $f(x)$.

The autocorrelation is used in surface metrology to categorize the different types of surfaces. The autocorrelation function always has a maximum value of $c_f(x')$ at x'=0. Random surfaces, such as diffusers, have the characteristic that $c_f(x')$ will rapidly attenuate as x' is increased above zero. For purely periodic surfaces $c_f(x')$ will oscillate to it's maximum value at an interval that corresponds to the nominal period of the structure (See FIGS. 12(a)-(h), wherein (a) correlates with (e), (b) with (f), and so forth) This occurs for integration over negative infinity to positive infinity; finite profiles of periodic surfaces will have a similar oscillations in $c_f(x')$ that tapers off linearly to zero at a length that is equal to the length of the sample).

One way to quantify the randomness of a surface is using the autocorrelation length of $f(x)$. The autocorrelation length ($L_c$) is the distance from x' at which $c_f(x')$ first decreases below a threshold. The threshold is a fraction of c(x') at x'=0, typically $e^{-1}$ (0.37). Generally speaking, the shorter the correlation length, the more random the surface. For a surface whose topography consists of pure white noise $c_f(x')$ reduces to a delta function and $L_c=0$.

A larger correlation length means that the surface is less random than a surface with a smaller correlation length. A more detailed discussion of the autocorrelation function is provided in David J. Whitehouse, *Handbook of Surface Metrology*, IOP Publishing Ltd. (1994), p. 49-58.

The examples in FIG. 12 show autocorrelation function analysis for a 1.7 millimeter by 1.7 millimeter (mm) model of film examples with increasing random lateral modulation for each example from left to right. Each example is sampled in a 1 micrometer by 1 micrometer grid and the auto correlation function is evaluated for a 1.7 millimeter long profile taken from the w direction (height h as a function of w). The analysis is performed using the MATLAB analysis software standard function xcorr.m provided with MATLAB release "R12". The "coeff" option is used to provide a normalized output for zero lag (the initial value).

Figure 13A:
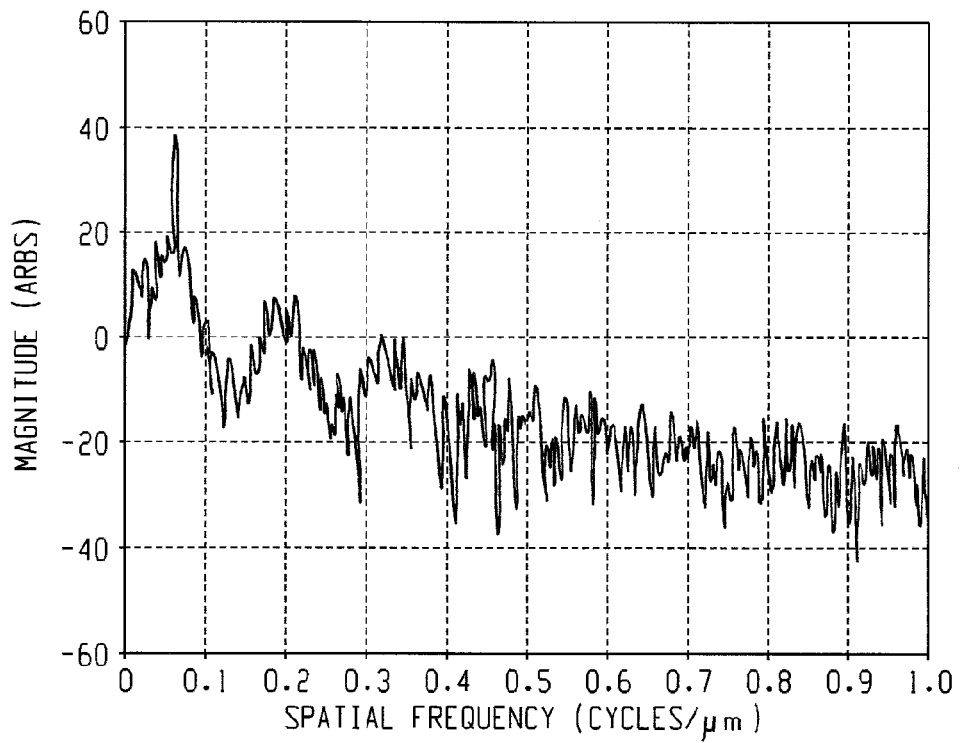
FIGS. 13(a)-13(d) graphically illustrate the power spectral density function of f(x) for modulated prism surfaces of FIGS. 12(a)-(d) from profiles taken in the w direction, wherein each profile is 1.7 mm long with a 1 micrometer sample distance.
Figure 13B:
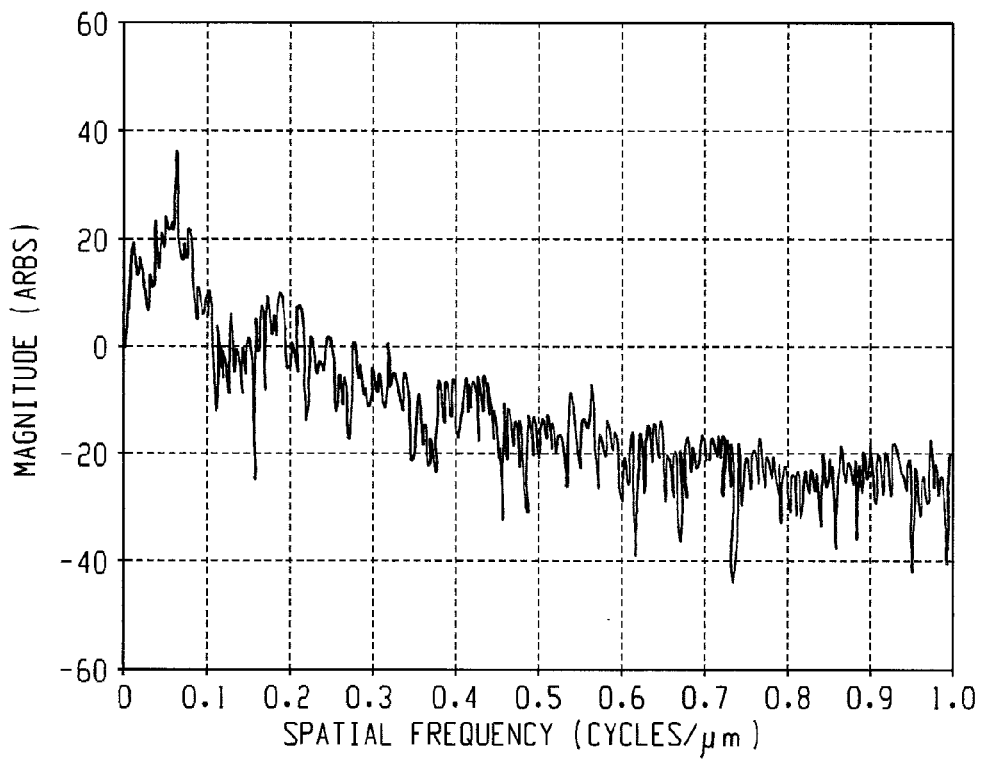
Figure 13C:
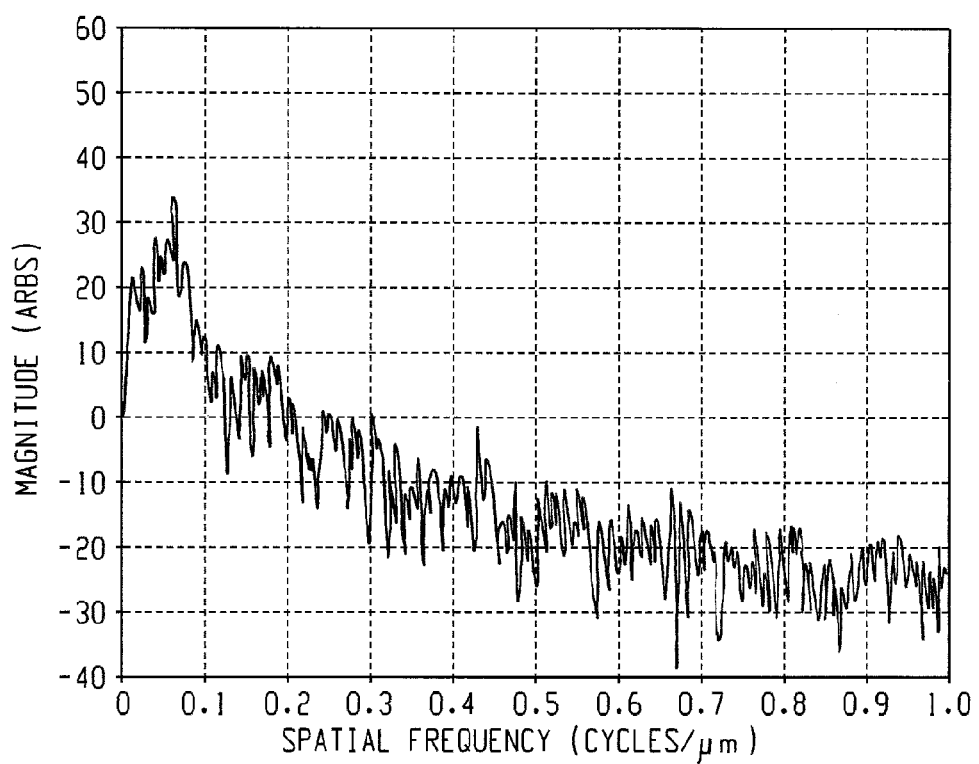
Figure 13D:
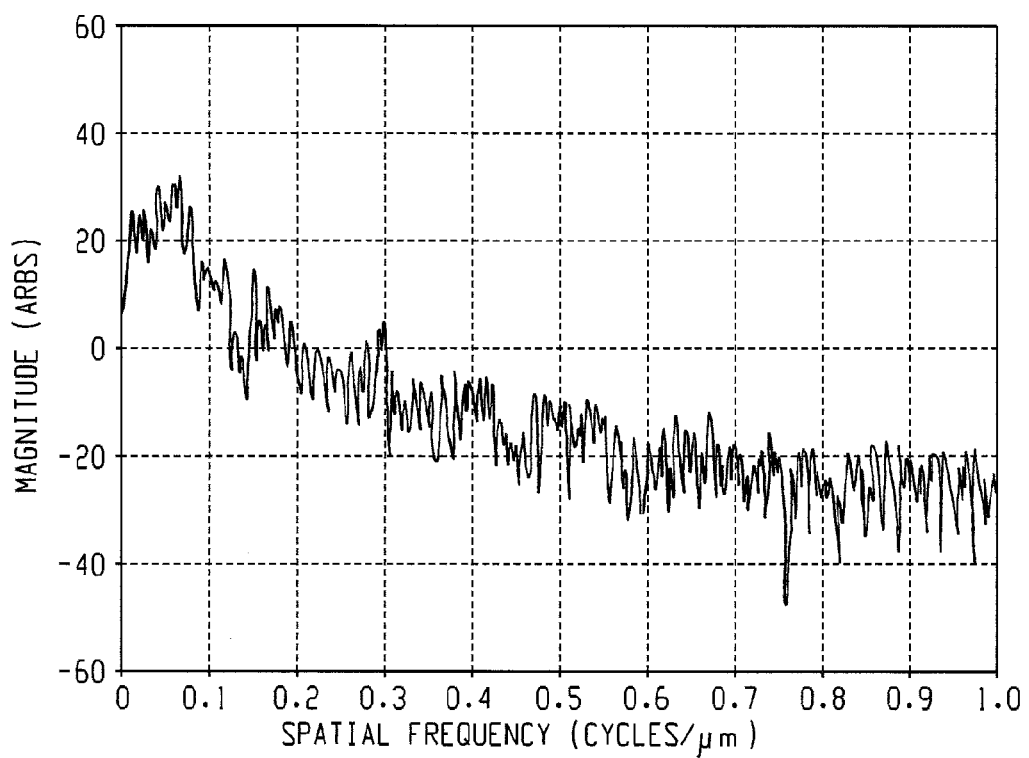

Note that the autocorrelation function oscillates at an interval equal to the average pitch of the examples (all have 37 µm average pitch). The envelope of the oscillations drops off nearly linearly for FIG. 12(e) (FIG. 12(h) with the least lateral modulation) as a function of position. All the other examples have envelopes that drop to lower values more rapidly as a function of position (increasingly so toward FIG. 13(h)). This drop is due to the increased randomness caused by increasing random lateral modulation.

In some embodiments, the value of the autocorrelation function for the three-dimensional surface of the optical substrate for a 1.7 mm sample drops to less than or equal to 1/e (1/2.7183) of its initial value in a correlation length of less than or equal to 0.5 millimeter (mm). In still other embodiments, the value of the autocorrelation function drops to 1/e of its initial value in less than or equal to 0.1 mm. The 1.7 mm sample scans can be taken from a lateral profile at any location on a film or other optical substrate that employs the technology.

The correlation length is related to the reduction of moiré artifacts. As noted, smaller correlation length indicates a more random surface than a larger correlation length, and this smaller correlation length also relates to greater diffusion and the reduction of moiré artifacts. Because the three-dimensional surfaces of the substrates (FIGS. 12(b)-(d)) are highly irregular, as indicated by the low correlation length, the substrates can be effective to reduce moiré artifacts.

As noted above, it has unexpectedly been discovered that even sight lateral modulation is enough to mask the undesirable the visual appearance that is caused by substantially periodic prism peak height modulation patterns. The height variation or the prism peaks can have a very long period: with a wavelength that is several times that maximum length of the prisms in the l direction of a particular substrate. This can be physically manifested as long wavelength variations in the height of a cutting tool around a drum used as a master for the films. For an illustration purposes, the l maximum length of a substrate is equivalent to one circumferential pass around the outer diameter of a mastering drum (though this can change in other cases). In this case every prism is equivalent to a ring around the drum and can be identified by drum revolution number, distance along l is equivalent to the position in rotation about the drum axis (t, with units of radians).

The purpose of the height variation is to minimize optical coupling. This is achieved by creating height variations such that the majority of prisms do not experience optical coupling. This can be achieved by keeping the majority of prism peaks at least 0.5 micrometers below the highest prisms' peak height for any profile of a substrate as measured in the w direction (0.5 millimeters to 1.7 millimeter being a suitable measurement width a diamond stylus profilometer with a tip radius of less than 2 µm can be the instrument to verify the height variation). This distance has been found to substantially avoid contact with the lower prisms, even in the presence of a warped substrate. The net effect is that the density of contacting prisms is substantially reduced and the optical coupling effect is less prominent.

The following is an example of a waveform for the height of modulation, h(l). Here t is related to l by a drum diameter, d, such that for each $j^{th}$ ring around the drum (nominally separated from each other by pitch p), l is equal to t times d. Note that since each ring corresponds to an individual prism the $j^{th}$ ring is equivalent to the $j^{th}$ prism. Let the height for each peak at t=0 for each of a number of adjacent rings be identified by a ring number j such that h is a function of j or just h(j)). The height modulation can be continuous along l (e.g., the height varies along the length of each prism) or discrete from ring to ring (e.g., the height does not vary along the length of each prism, but does vary between prisms), or a combination of both. Define a period=15.5; and a beta=4, so that $$h(j) = 0.25\cos\left(\left(\frac{\pi j}{\text{period}}\right)^{beta} + \left(\frac{3\pi j}{\text{period}}\right)^{beta} + \left(\frac{5\pi j}{\text{period}}\right)^{beta} + \left(\frac{7\pi j}{\text{period}}\right)^{beta}\right)$$

Here beta is a non-linear scale factor that provides for a skewed distribution in height, cos is the cosine function. A profile of the peak heights (h(j)) is given in FIG. 8. Note that these heights are defined with h=0 defined at the height of the shortest peak or a nominal reference height. A histogram of the height variation over an entire substrate with this modulation is given in FIG. 9.

Figure 8:
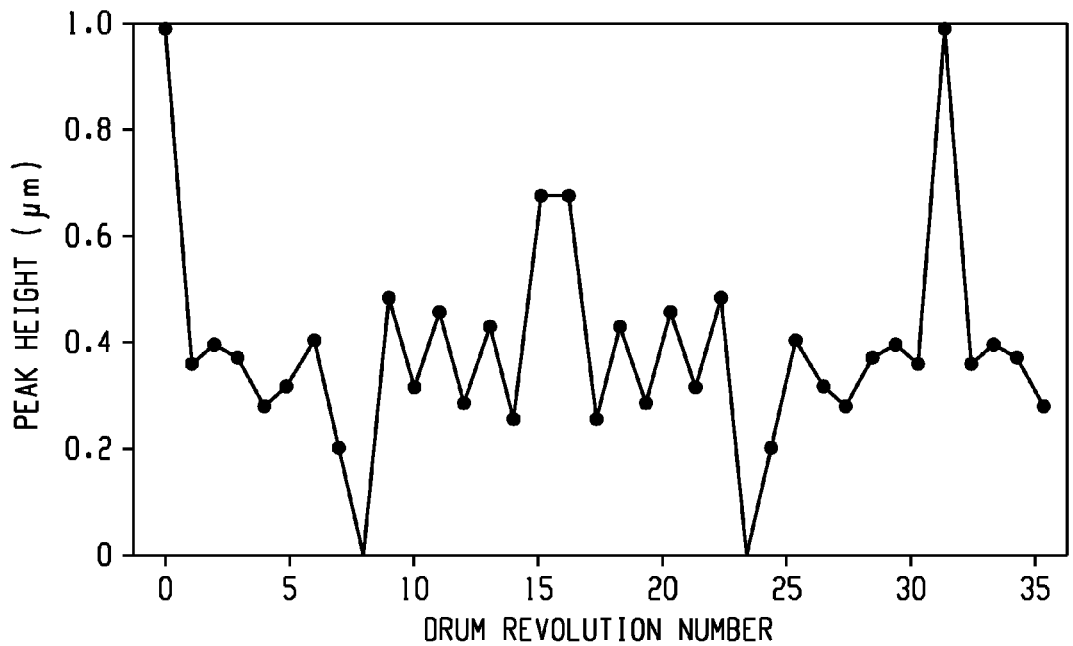
FIGS. 8 and 10 are exemplary graphical profiles of the peak heights h(j).
Figure 9:
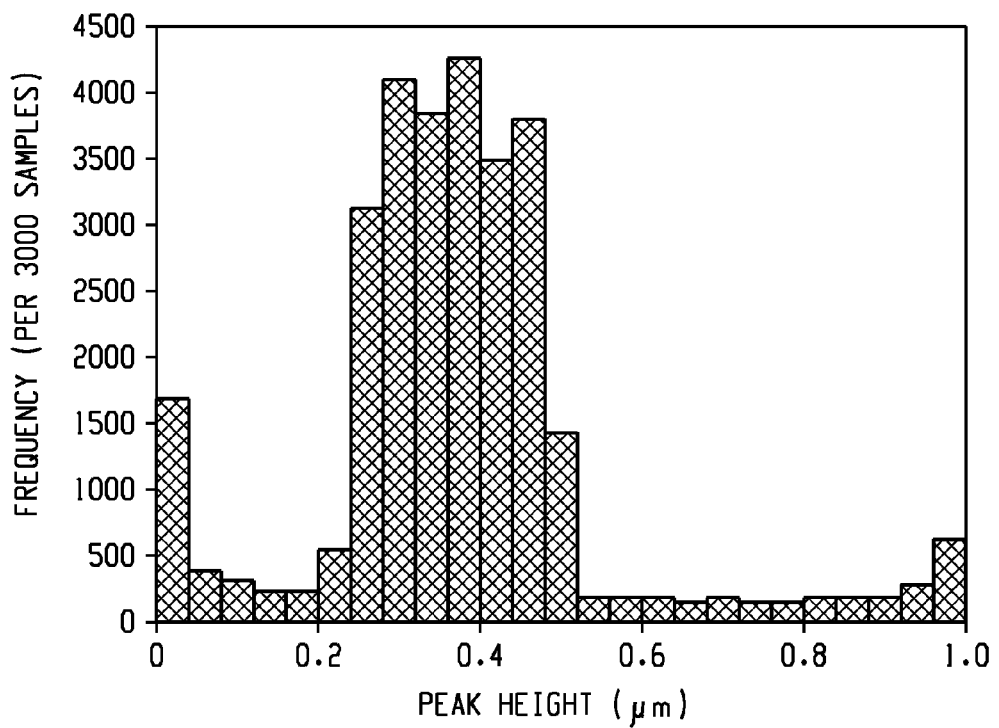
FIGS. 9 and 11 are a histogram of the height variation over an entire substrate with the modulation for the profiles of FIGS. 8 and 10, respectively.
Figure 10:
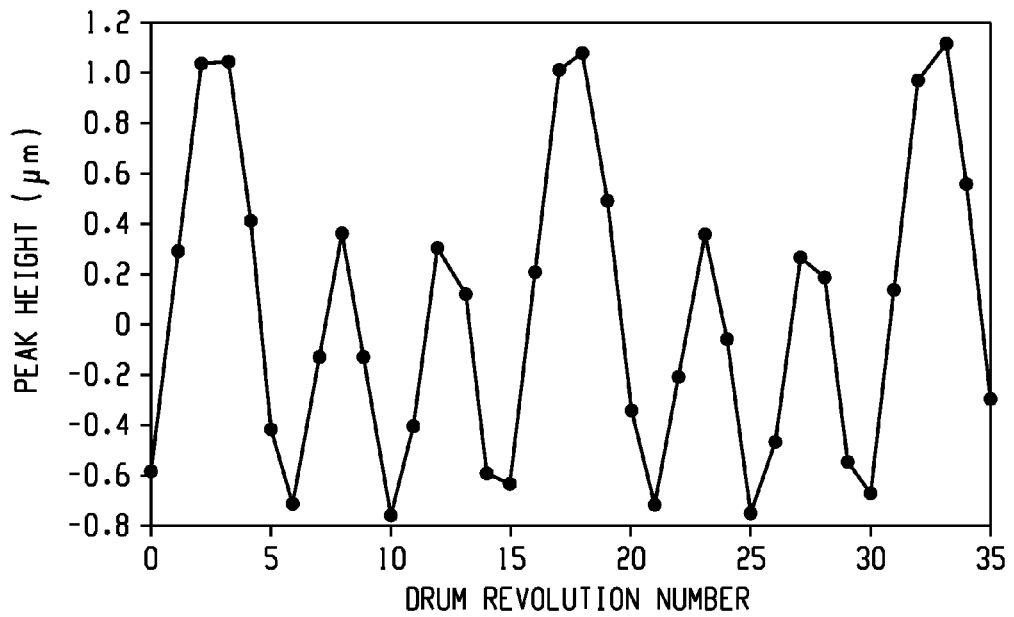
Figure 11:
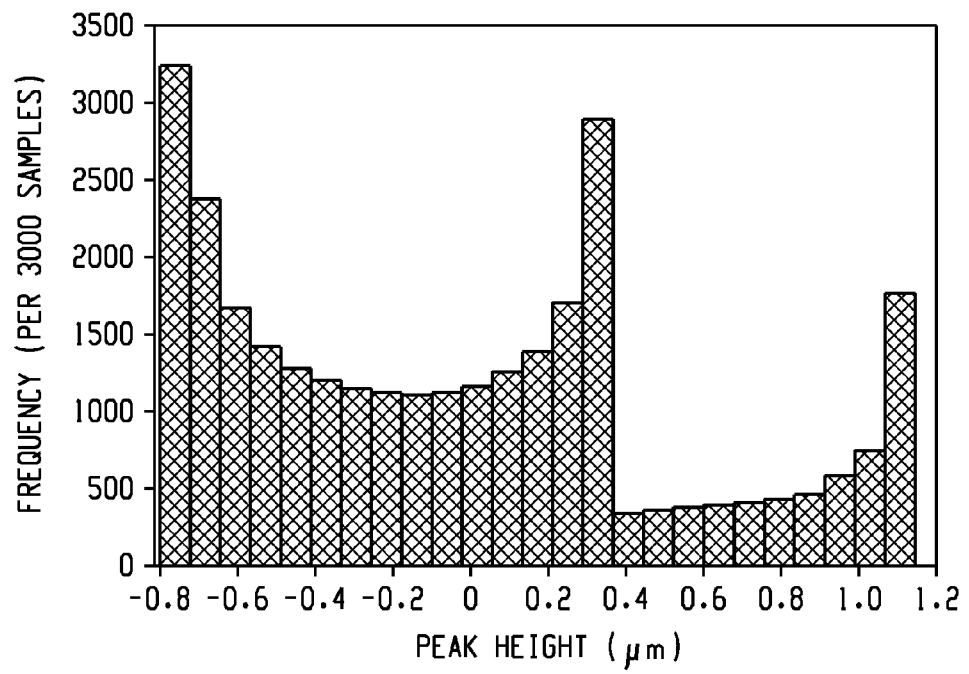
Figure 12A:
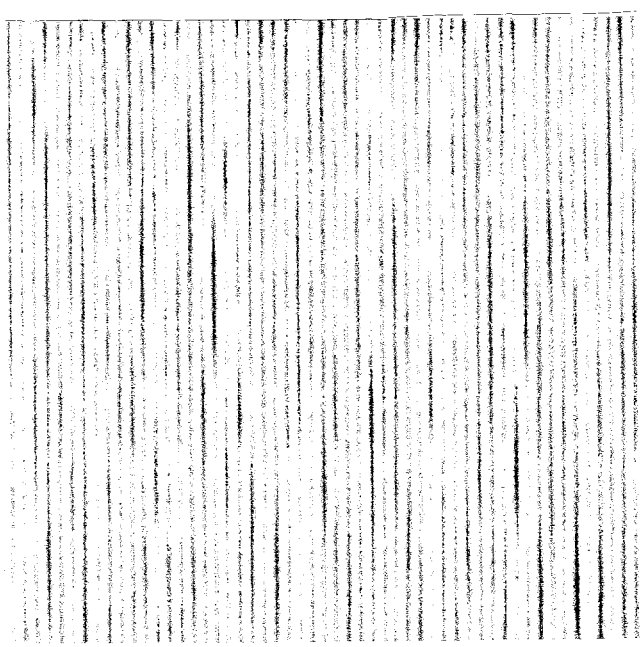
FIGS. 12(a)-12(d) illustrate exemplary modulated surface height maps from profiles taken in the w direction, wherein each profile is 1.7 mm long with a 1 micrometer sample distance.
Figure 12A:
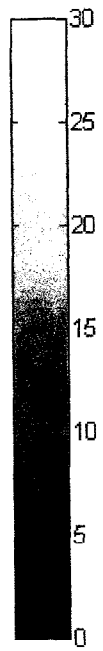
Figure 12B:
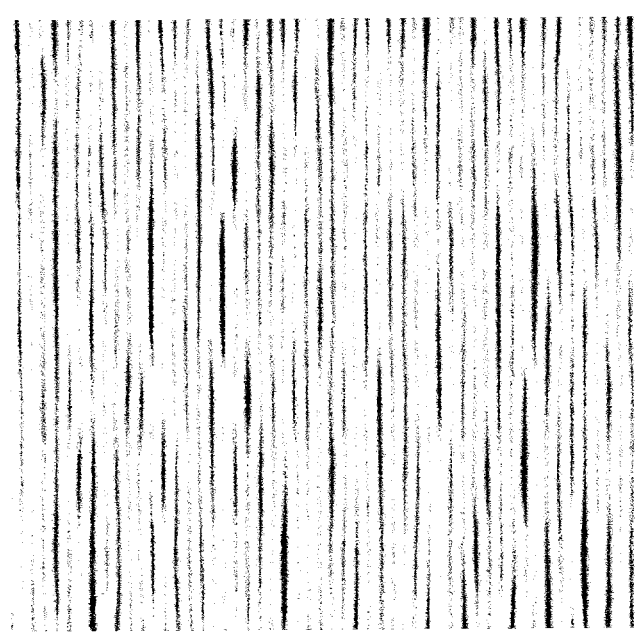
Figure 12B:
Figure 12C:
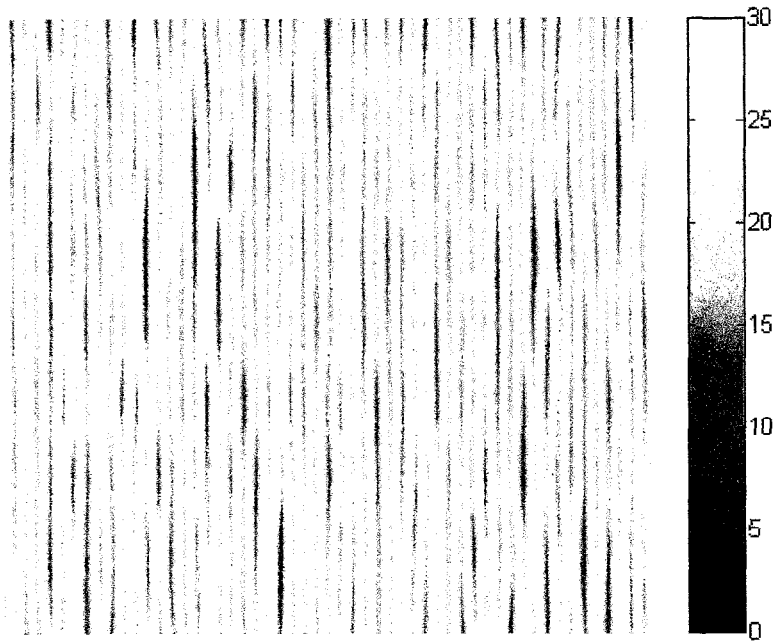
Figure 12D:
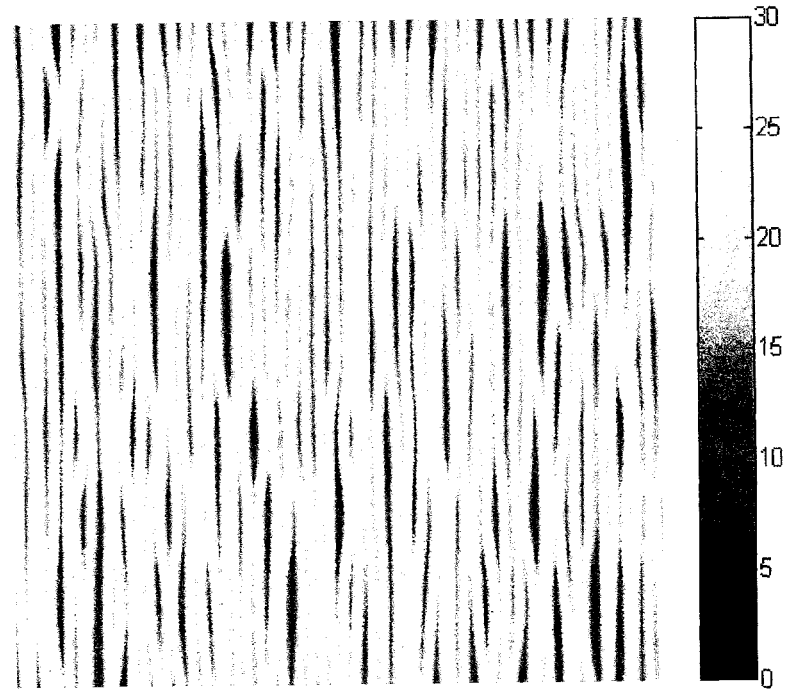
Figure 12E:
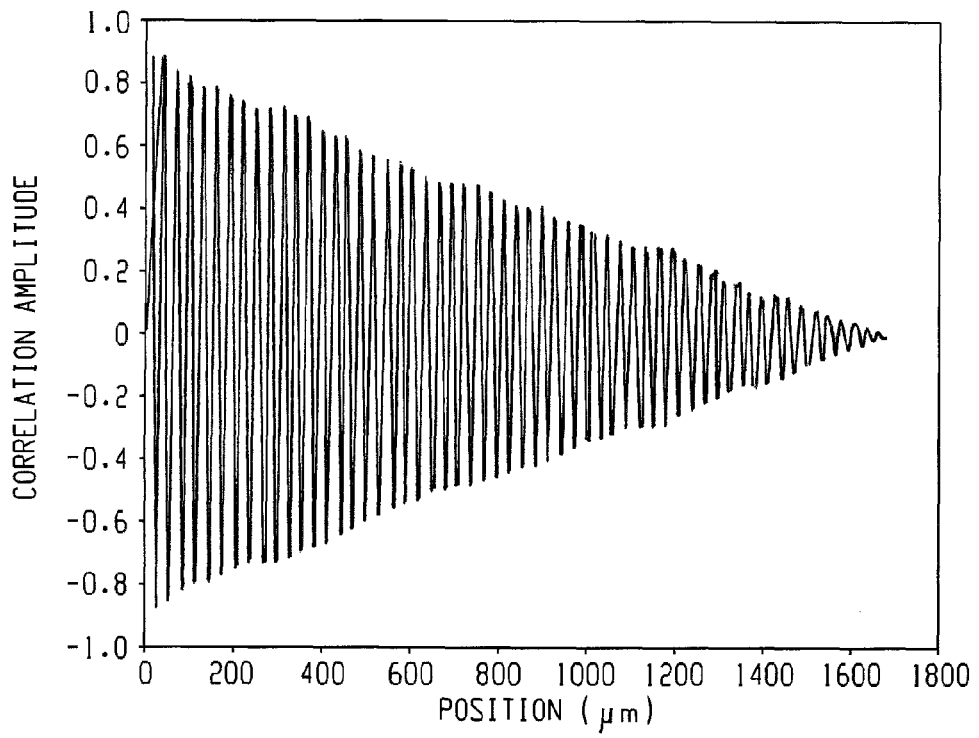
FIGS. 12(e)-12(h) graphically illustrate exemplary autocorrelation functions for the surfaces illustrated in FIGS. 12(a)-(d), respectively.
Figure 12F:
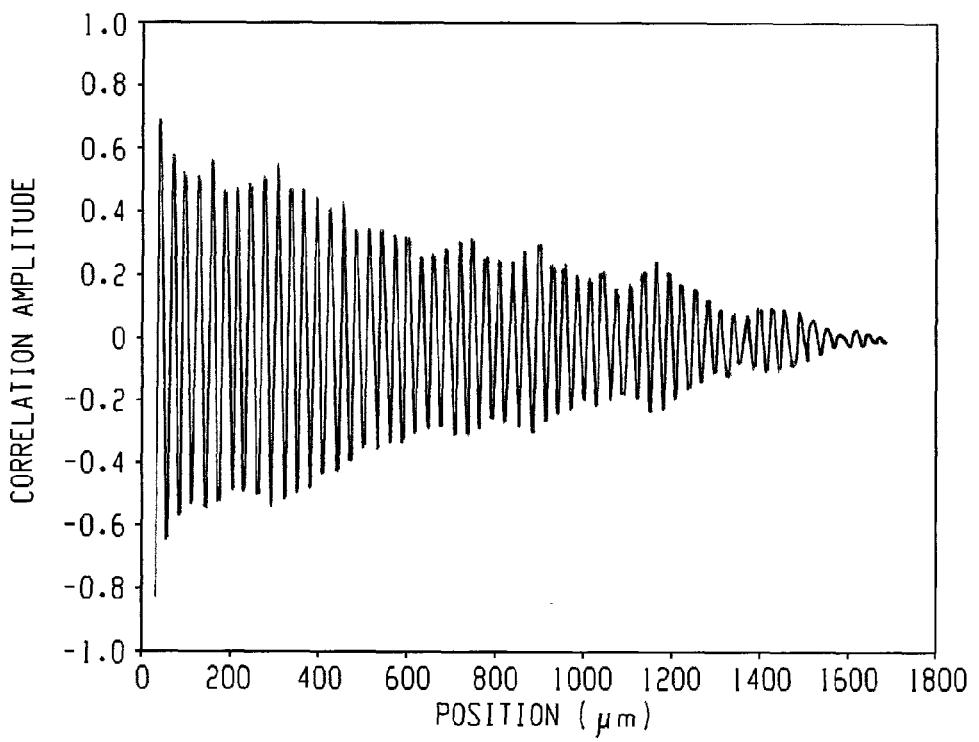
Figure 12G:
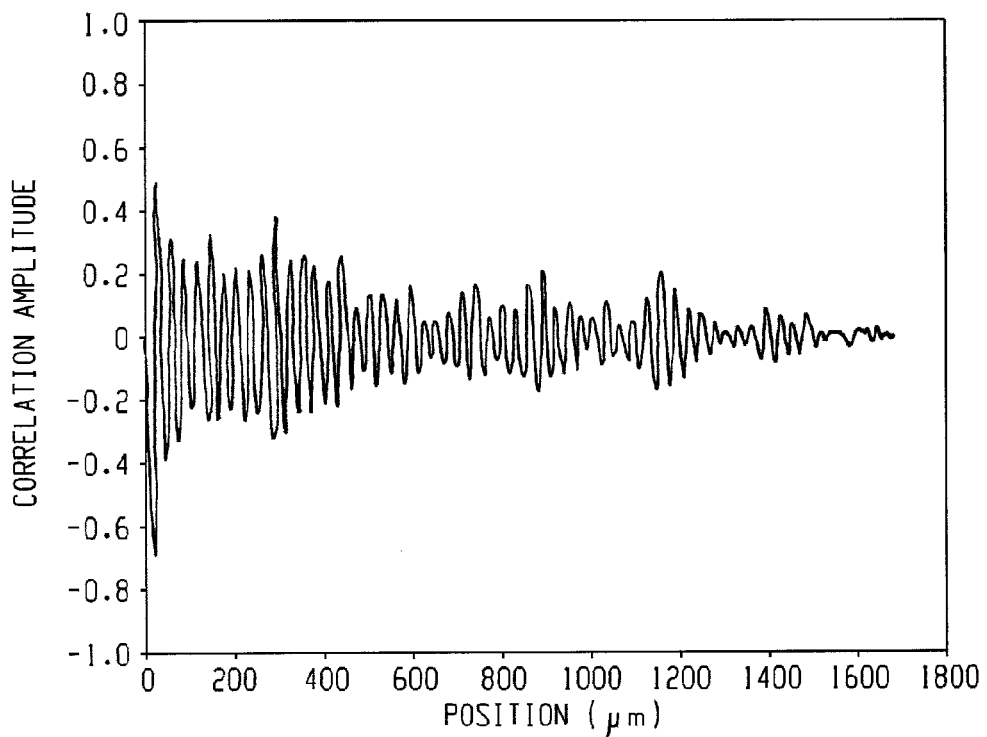
Figure 12H:
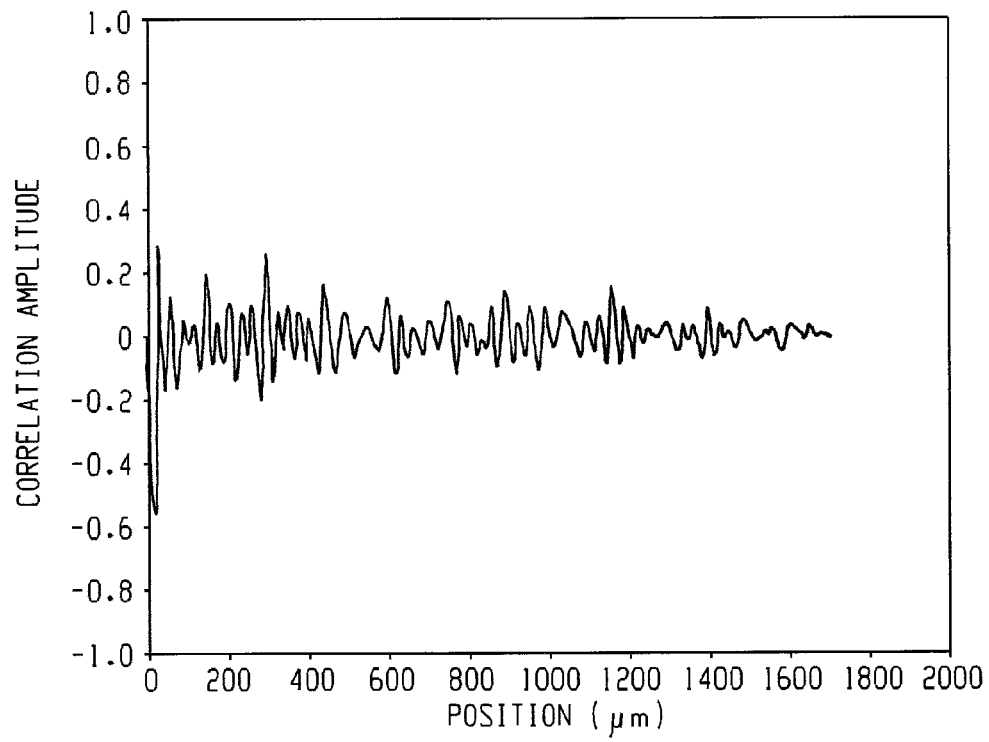

Another example of h(j), as illustrated in FIG. 10, is as follows:

$$h(j) = a^0 + a^1 \cos(jw) + b^1 \sin(jw) + a^2 \cos(2jw) + b^2 \sin(2jw) + a^3 \cos(3jw) + b^3 \sin(3jw) + a^4 \cos(4jw) + b^4 \sin(4jw) + a^5 \cos(5jw) + b^5 \sin(5jw)$$

wherein (with the units of height being micrometers):
$a^0 = -0.001667$
$a^1 = 0.1807$
$b^1 = 0.3245$
$a^2 = -0.2006$
$b^2 = 0.3085$
$a^3 = -0.58$
$b^3 = -0.005871$
$a^4 = 0.003714$
$b^4 = 0.1724$
$a^5 = -0.0004167$
$b^5 = -0.0016$ and
$w = 0.4516$ Note that both of the examples above can be re-formulated as equivalently continuous in 1. As shown in FIGS. 8 and 10, this height modulation also has the property of providing a distribution of peaks heights that keeps the majority of peak height on a level of 0.5 μm or more below the highest peaks. Although the waves are periodic, a random waveform formed with similarly large component wavelengths (i.e., spatial frequency content) can achieve a similar effect as long as the distribution is skewed to the majority of the peaks being greater than or equal to 0.5 μm below the highest peak height (i.e., the median height is at least 0.5 μm less than the tallest peak height). If the high peaks occur in a cluster (adjacent peaks with a height within 0.25 micrometers of the maximum peak height) it is desirable that less than or equal to 3 peaks (or, specifically, 2 peaks) occur in each cluster and that each cluster is separated by greater than or equal to 5 lower peaks, or, specifically, greater than or equal to 8 lower peaks, (for any w direction profile). This separator helps to avoid visually objectionable large regions of wet-out. The occurrence of cluster does not have to be limited to strictly periodic but this does simplify the design of the height variation. Even when employing randomization to the height variation the long wavelengths desired tend to produce objectionable streakiness in the appearance of the films if the slight lateral modulation is not used. Note that the period of the height modulation does not need to an integer multiple of the prism pitch.

The actual surface of the substrates, which can have characteristic dimensions of less than or equal to 4 meters in the w and 1 dimensions, independently, and have good surface roughness (e.g., the facets are smooth with a an average surface roughness, $R_a$, less than or equal to 4 nanometers (nm), desirably, less than or equal to 1 nanometer), can be generated in accordance with a number of processing techniques. These processing techniques include photolithography, gray-scale lithography, microlithography, electrical discharge machining and micromachining using hard tools to form molds or the like for the surface model described above.

For example, the method of making the substrates can be by mastering, electroforming, and mold forming. Photolithographic mastering can be used to directly laser write to a photoresist, a gray scale mask, and/or a series of halftone masks that can be tiled. The photoresist can be directly removed by the laser photons or used as a precursor to an additional process step, such as reactive ion etching (RIE). Alternatively, or in addition, the geometry might be mastered using hard tools, such as a single point diamond tool on a multi-axis mill. The master will generally be made as a negative. The substrate of the master can be glass, (fused silica for example), metal (copper or nickel for example) or plastic (polycarbonate for example). The master can be used to mold plastic parts directly or used in electroforming.

Electroforming can be in one multiple (e.g., two) stages, wherein the master is a positive if only one stage is used. The master can be coated with a thin metal coating (especially if the master is not inherently conductive). A "father" electroform is created by electro-depositing nickel (or another material) on the master. This replica is again electroformed to create a "daughter" that is used to mold the plastic parts.

The object that is used to mold the device (films) is referred to as the mold. The mold can be in the form of a belt, a drum, a plate, or a cavity. The mold can be tiles from a plurality of masters or electroforms. The mold can be used to form the structures on a substrate through various processing embossing (e.g., hot embossing of the substrate), calendaring (e.g., cold calendaring of the substrate) and/or through the addition of an ultraviolet curing or thermal setting material in which the structures are formed. The mold can be used to form the film through various techniques such as injection molding, vacuum forming, and so forth. The substrate or coating material can be any organic, inorganic or hybrid optically transparent material and can include suspended diffusion, birefringent, and/or index of refraction, modifying particles.

The optical substrate so formed can be formed with an optically transparent material with an index of refraction of 1.1 to 3.0 and more particularly with an index of refraction of approximately 1.45 to 1.7.

Ranges disclosed herein are inclusive and combinable (e.g., ranges of "up to 25 wt %, or, more specifically, 5 wt % to 20 wt %", is inclusive of the endpoints and all intermediate values of the ranges of "5 wt % to 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The suffix "(s)" as used herein is intended to include both the singular and the plural of the term that it modifies, thereby including one or more of that term (e.g., the colorant(s) includes one or more colorants). The notation "±10%" means that the indicated measurement can be from an amount that is minus 10% to an amount that is plus 10% of the stated value. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments and are not limited to the specific combination in which they are discussed.

While the films have been described with reference to exemplary embodiments, it will be understood by those skilled in the art that various changes can be made and equivalents can be substituted for elements thereof without departing from the scope. In addition, many modifications can be made to adapt a particular situation or material to the above teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A film, comprising:
   a surface comprising a plurality of prism structures, wherein each prism structure has a lateral modulation in a w direction of ±2% to ±20% of an average pitch of the prism structures;
   wherein the plurality of prism structures have a variation in the w direction of prism peak height that is discrete and/or continuous; and
   wherein with a highest prism peak height is periodic at an interval measured in the w direction of greater than or equal to five times an average pitch, wherein the average pitch is determined over a sample length in the w direction of 100 mm, wherein the interval w direction is perpendicular to the l direction.

2. The film of claim 1, wherein a majority of prism peaks are greater than or equal to 0.5 micrometers below the highest prism peak height for any profile taken in the w direction.

3. The film of claim 2, wherein there is a cluster of peaks, as determined in the w direction, wherein the cluster contains less than or equal to 3 peaks and each cluster is separated by greater than or equal to 5 lower peaks being, and wherein the cluster is a group of adjacent peaks with a height within 0.25 micrometers of the highest prism peak height.

4. The film of claim 1, wherein there is a cluster of peaks, as determined in the w direction, wherein the cluster contains less than or equal to 3 peaks and each cluster is separated by greater than or equal to 5 peaks, and wherein the cluster is a group of adjacent peaks with a height within 0.25 micrometers of a highest prism peak height.

5. A film, comprising:
   a surface comprising a plurality of prism structures, wherein each prism structure has a lateral modulation in a w direction of ±2% to ±20% of an average pitch of the prism structures;
   wherein the plurality of prism structures have a variation in the w direction of prism peak height that is discrete and/or continuous;
   wherein the modulation is ±2% to ±15% of the average pitch wherein the average pitch is determined over a sample length in the w direction of 100 mm, wherein the interval w direction is perpendicular to the l direction.

6. The film of claim 5, wherein the modulation is ±5% to ±10% of the average pitch.

7. The film of claim 5, wherein prism structures have a height modulation in the l direction.

8. The film of claim 7, wherein the height modulation is random.

9. The film of claim 5, wherein the lateral modulation comprises a variable prism spacing.

10. The film of claim 5, wherein the lateral modulation is random.

11. The film of claim 5, wherein the variation is periodic and sinusoidal.

12. A backlight display comprising a light source and the film of claim 5.

13. A film, comprising:
    a surface comprising a plurality of prism structures;
    wherein each prism structure has a lateral modulation in the w direction of ±2% to ±15% of an average pitch of the prisms;
    wherein the plurality of prism structures has a variation in the w direction of prism peak height that is discrete and/or continuous; and
    wherein with a highest prism peak height is sinusoidal and periodic at an interval measured in the w direction of greater than or equal to five times an average pitch, wherein the average pitch is determined over a sample length in the w direction of 100 mm, wherein the interval w direction is perpendicular to the l direction.

14. A film, comprising:
    a surface comprising a plurality of prism structures, wherein each prism structure has a lateral modulation in a w direction of ±2% to ±20% of an average pitch of the prism structures;
    wherein the plurality of prism structures have a variation in the w direction of prism peak height that is discrete and/or continuous;
    wherein there is a cluster of peaks, as determined in the w direction, wherein the cluster contains less than or equal to 3 peaks, and wherein the cluster is a group of adjacent peaks with a height within 0.25 micrometers of a highest prism peak height; and
    wherein the cluster is separated by greater than or equal to 8 lower peaks.

15. The film of claim 14, wherein the average pitch is determined over a sample length in the w direction of 100 mm, wherein the interval w direction is perpendicular to the l direction.

* * * * *